US006471194B2

(12) United States Patent
Keeney

(10) Patent No.: US 6,471,194 B2
(45) Date of Patent: Oct. 29, 2002

(54) MIST FAN

(76) Inventor: Bart Keeney, 3125 County Rd. 805B, Cleburn, TX (US) 76031

( * ) Notice: Subject to any disclaimer, the term of this patent is extended or adjusted under 35 U.S.C. 154(b) by 0 days.

(21) Appl. No.: 09/736,992

(22) Filed: Dec. 14, 2000

(65) Prior Publication Data

US 2002/0074674 A1 Jun. 20, 2002

(51) Int. Cl.[7] .................................................. B01F 3/04
(52) U.S. Cl. ...................... 261/30; 239/8; 239/214.25; 239/403; 239/600; 261/116; 261/DIG. 4
(58) Field of Search ..................... 261/30, 116, DIG. 4; 239/8, 403, 214.25, 587.1, 600

(56) References Cited

U.S. PATENT DOCUMENTS

| | | | | |
|---|---|---|---|---|
| 3,606,982 A | * | 9/1971 | Anderson | 261/DIG. 4 |
| 3,640,465 A | * | 2/1972 | Hicks | 239/600 X |
| 4,489,914 A | * | 12/1984 | Stevenson et al. | 239/587.1 X |
| 4,500,479 A | * | 2/1985 | Fukami et al. | 261/DIG. 4 |
| 4,711,395 A | * | 12/1987 | Handfield | 261/30 X |
| 4,738,401 A | * | 4/1988 | Filicicchia | 239/600 |
| 4,815,666 A | * | 3/1989 | Gacka et al. | 239/600 X |
| 5,046,449 A | | 9/1991 | Nelson | 118/315 |
| 5,271,564 A | * | 12/1993 | Smith | 239/587.1 X |
| 5,299,960 A | | 4/1994 | Day et al. | 440/38 |
| 5,522,549 A | * | 6/1996 | Sheu | 239/600 X |
| 5,713,519 A | * | 2/1998 | Sandison et al. | 239/8 |
| 5,715,999 A | | 2/1998 | Hsu | 239/29 |
| 5,752,662 A | | 5/1998 | Hsu | 239/215 |
| 5,889,275 A | * | 3/1999 | Chen | 239/587.1 X |
| 6,042,029 A | * | 3/2000 | Massey | 239/587.1 |
| 6,079,638 A | * | 6/2000 | Chang | 239/587.1 X |
| 6,086,053 A | * | 7/2000 | Natschke et al. | 261/116 X |
| 6,237,896 B1 | * | 5/2001 | Hicks et al. | 261/30 X |

* cited by examiner

*Primary Examiner*—Richard L. Chiesa
(74) *Attorney, Agent, or Firm*—Bracewell & Patterson, LLP

(57) ABSTRACT

A mist assembly connected to an existing fan grill resulting in a cooling device that has an electrical fan member and a mist assembly featuring an atomizing nozzle. The mist assembly is operably associated with the fan member. The mist assembly has a pump member that draws water from a water source and pumps the water through the atomizing nozzle. The water mist emitted from the nozzle is uniformly dispersed as a fine mist within the airflow produced by the rotating fan blades and creates a cooling effect.

7 Claims, 1 Drawing Sheet

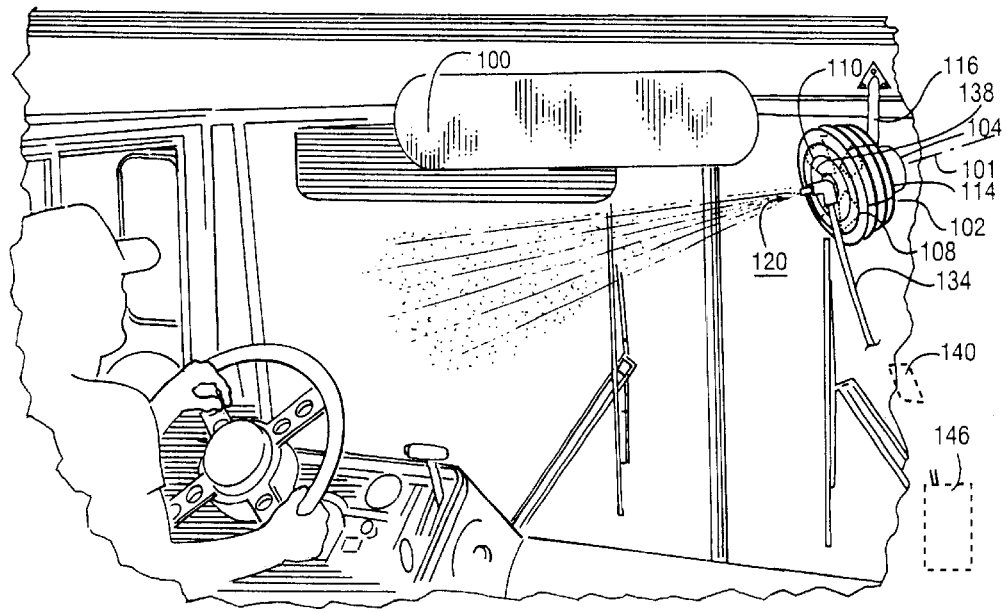
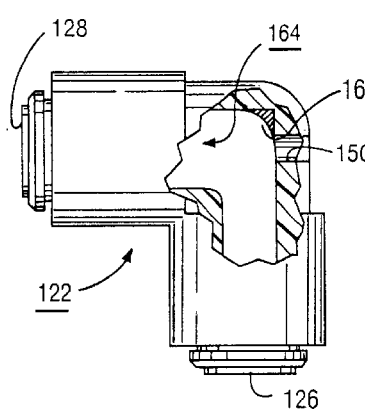
FIG. 3
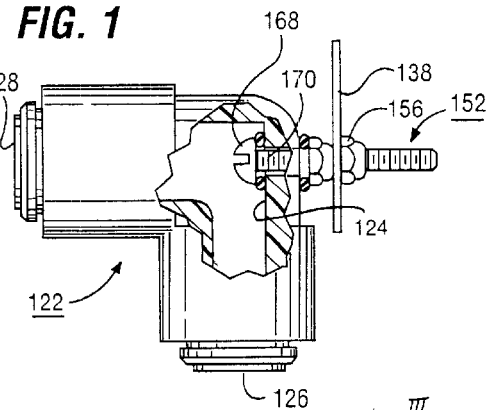
FIG. 3a
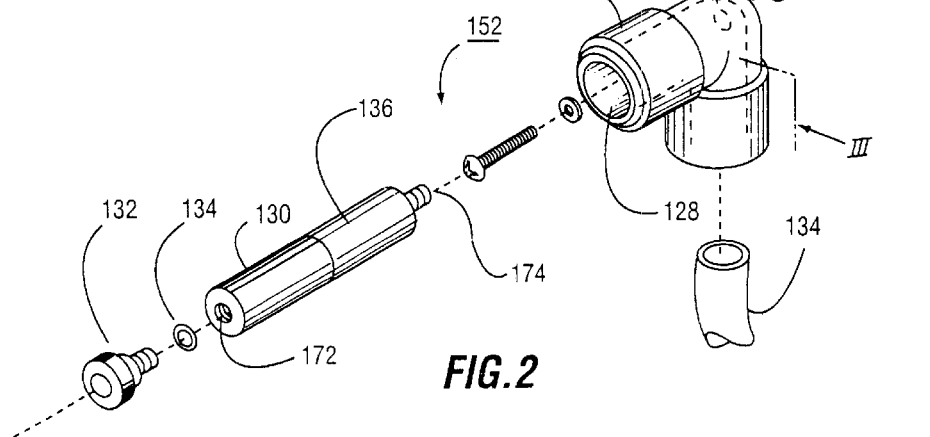
FIG. 2

MIST FAN

BACKGROUND OF THE INVENTION

1. Technical Field

The present invention relates generally to personal cooling devices, and in particular, to personal cooling devices that utilize fans and water mist.

2. Description of the Related Art

Personal cooling devices utilizing fans and water mist have been used in hot-weather conditions for some time. The combination of a fine spray mist and increased air flow facilitates evaporation from the skin and, in turn, lowers the skin and body temperature of persons in the immediate fan environment. In recent years, water misters have been used in conjunction with fans or air blowers to specifically direct water bearing airflows toward the area to be cooled. Such devices are widely used to cool patios, decks and large open areas. Also, misters are employed at athletic events to provide a cooling environment for participants. Although these devices can be used to cool several people at once, they are bulky and take up a large amount of space.

The concept of combining spray mist with a fan has been scaled down to the individual level by equipping small, hand-held pump-spray bottles with small electrical fans. The fan blades on these devices are relatively small and often made of soft plastic or foam rubber to prevent injury to the user. Although these devices are portable, their capacity is limited because the volume of the spray bottle must be kept low due to the weight of the water. If the volume of the spray bottles exceed a quart or so, the bottle becomes too heavy to carry conveniently. In addition, these handheld held devices are usually powered by low-power batteries, thereby limiting the operational life of the devices. Also, these devices require at least one hand to operate the misting assembly.

During the summer, school buses and other vehicles can be unbearably hot. Unfortunately, the above devices offer little or no relief. The large box-type fans with drip or mist systems cannot fit into the limited space required for use in or around a vehicle. The small hand-held devices simply do not have adequate capacity, as measured by either the volume of water available, or by their electrical operational lives to keep users cool. In addition, the small hand-held devices require at least one hand to operate the misting assembly and thereby create a potentially unsafe situation if the driver is using such a device.

Although misting devices represent significant development in the area of personal cooling devices, significant shortcomings remain, particularly in the area of misting devices for use on or around vehicles. There is a need for a cooling device for use on a vehicle, the cooling device being powered by the vehicle's existing electrical power supply and having a relatively large water capacity. This is especially true in the case of large vehicles such as a school bus or fire truck.

BRIEF SUMMARY OF THE INVENTION

It is an object of the present invention to provide a cooling device for use on a vehicle, the cooling device being connected to the vehicle's existing electrical power supply, the cooling device having a fan member, a mist assembly operably associated with the fan member, and a pump member that pumps water from an available water source.

It is another object of the present invention to provide a mist assembly and an electric fan having electric motor driven blades rotating about a central axis and covered by a guard grill, wherein the mist assembly is mounted on the center of the front guard grill and uniformly disperses a fine mist within the airflow produced by the rotating fan blades.

It is yet another object of the present invention to provide a mist assembly for bladed fans having guard grills wherein the mist assembly is easily mounted on the guard grill, and may be retrofitted to existing fans of this type.

The above objects are achieved by providing a mist assembly that connects to an existing fan grill. The cooling device has an electrical fan member and a mist assembly featuring an atomizing nozzle. The mist assembly is operably associated with the fan member. The mist assembly has a pump member that draws water from a water source and pumps the water through the atomizing nozzle. The water mist emitted from the nozzle is uniformly dispersed as a fine mist within the airflow produced by the rotating fan blades and creates a cooling effect of about 20° F. Because the mist assembly of the present invention is powered by the vehicle's electric power supply, and has a relatively large water capacity, the mist assembly has a relatively long operational life.

These and other objects and advantages of the present invention will be apparent in the following detailed description when read in conjunction with the accompanying drawings.

BRIEF DESCRIPTION OF THE DRAWINGS

The novel features believed characteristic of the invention are set forth in the appended claims. The invention itself however, as well as a preferred mode of use, will best be understood by reference to the following detailed description of an illustrative embodiment when read in conjunction with the accompanying drawings, wherein:

FIG. 1 is a perspective view of a mist fan installed within a school bus according to the present invention;

FIG. 2 is an exploded view of the nozzle and nozzle element making a portion of the mist assembly of the invention;

FIG. 3 is a perspective view, partly broken away, of the nozzle mounting element of the invention; and FIG. 3A is a view similar to FIG. 3 showing the attachment element of the nozzle mounting element.

DETAILED DESCRIPTION OF THE PREFERRED EMBODIMENT

Referring to FIG. 1 in the drawings, the preferred embodiment of a mist assembly 120 for a vehicle 100 is illustrated. Although the vehicle 100 is shown as a school bus, it should be understood that the vehicle 100 may be any one of a wide variety of vehicles including: fire trucks, ambulances, taxicabs, city busses, trains, limousines, airplanes, ships, etc. . . .

With reference to FIG. 1, a typical commercial type electric fan member 102 is shown having an electric motor 104, preferably a 12-Volt, variable-speed DC motor and a mounting bracket 116. The motor 104 includes a shaft (not shown) upon which a plurality of fan blades of less than about 12 inches in length are mounted. In the typical manner, the blades are enshrouded within a protective guard grill 108. The grill 108 includes conventional grill portions which are formed of welded wire circles and radial elements in the known manner. The grill portions are interconnected at a peripheral joining line 114 which may include a hinge for providing access to the blades. The fan member 102 may be either a stationary fan or an oscillating fan, depending upon the desired application. The fan has a central axis (101 in FIG. 1). The guard grill 108 at least partially surrounds the fan blades and prevents operators or passengers from contacting the fan blades. It should be understood that a fan motor switch may be located away from the fan member 102 for added convenience.

The mist assembly 120 includes a nozzle mounting element 122 which may be formed of a synthetic plastic material, or could be of metal or any other suitable material. The nozzle mounting element 122 includes a rear support surface 124 (FIG. 3A), an intake opening 126 for receiving a source of pressurized fluid and a discharge opening 128. The nozzle mounting element 122 is an elbow shaped member having a central bore 164 located between the intake opening 126 and the discharge opening 128. The bore 164 forms a right angle channel with an internally radiused rear surface 166 (FIG. 3) at the approximate mid-region thereof. The radiused surface 166 may be machined to a flat rear support surface 124 for the attachment of a threaded fastener 152. The threaded fastener 152 may be a bolt having a bolt head 168 and a threaded shaft 170 with the bolt head 168 being retained against the flat rear support surface 124 within the bore 164 of the nozzle mounting element 122. The mist assembly 120 (FIG. 2) includes a nozzle 130 and an associated nozzle element 132. The nozzle 130 and nozzle element 132 can be formed from a variety of materials and can be supplied in a range of convenient sizes, for example, 0.007, 0.008, 0.010, 0.020 inches in diameter. The nozzle element 132 is preferably an atomizing nozzle made of stainless steel or brass having an orifice about 0.007 inches in diameter that creates a fine mist, or vapor, although nozzles having other orifice sizes may be used. The nozzle element illustrated in FIG. 2 provides a flow rate of about 0.333 gallons of water per hour.

The nozzle 130 is releasably coupled to the nozzle element 132 and is sealed by an O-ring 134. In this way, the nozzle element 132 may be removed, replaced, interchanged, repaired, or unclogged, if necessary or desired. The particular nozzle 130 in FIG. 2 is a two piece tubular member including an extension portion 136 and having a continuous longitudinal passageway 174 for conducting fluid. The passageway 174 terminates in an outer mouth opening 172 which receives the nozzle element 132.

The nozzle 130 is received within the discharge opening 128 of the nozzle mounting element 122 in a snap-fit fashion. The nozzle mounting element 122 couples the nozzle 130 to a supply conduit 134. The first conduit 134 is preferably a conventional flexible hose having an inside diameter of about 0.375 inches in the embodiment illustrated. The supply conduit 134 should be of sufficient length to allow the fan member 102 to freely oscillate.

The nozzle mounting element 122 is adapted for attachment to the front grill portion 110 of the guard grill 108 at the approximate location of the central axis of the fan member 102, thereby creating an operable association between the fan member 102 and the mist assembly 120. However, it should be understood that the nozzle mounting element 122 may be located other positions as long as the mist from the nozzle 130 can be projected by the fan member 102. For example, the nozzle 130 may be located near the edge of the fan blades 106 and aimed at an angle toward the center of the fan blades 106.

The front grill portion of the guard grill 108 includes a central disc 138, a portion of which is shown in FIG. 3A. The mist assembly 120 is mounted on the front grill portion 110 of the guard grill 108 by first passing the threaded fastener 152 through a hole 150 in the rear support surface 124 of the nozzle mounting element 122. The threaded fastener 152 extends through a second hole 156 provided in the central disc 138 and is thus fixedly attached to the guard grill 108. Preferably, the axis of the mist assembly 120 is coincident with the axis of rotation of the fan shaft 105.

The pump 140 can be 12-Volt DC, high-volume electromechanical pump, similar to the Type IV pump commercially available from FLOWJET of Irvine, Calif. under model 4406-143 and model name FLOWJET QUIET QUAD. The pump 140 is preferably an "on-demand" type pump that continuously supplies water to the nozzle 130 at a pre-selected pressure. The pump 140 is preferably controlled by the fan motor switch, and is powered by any convenient power supply. The pump may also be a hand-held bulb pump, or any other manual type pump, such as a foot-pedal pump, if desired.

The pump is connected to a water source 146 and receives water from the water source 146. The water source 146 can be any source of water and in the preferred embodiment is a two gallon container. The water source 146 is pressurized by the pump as previously described.

An invention has been described with several advantages. The mist assembly 120 may be easily mounted upon either new or existing fan members 102 by means of the threaded fastener 152 and as will be appreciated from the description and drawings, the cost of manufacture of the mist assembly 120 is relatively low. No extensive modification to the fan member 102 are required and the mist assembly 120 may be mounted upon the fan member 102, or removed therefrom, without damage or modification to the fan member 102.

Because the nozzle 130 is operably associated with the fan member 102, water mist emitted from the nozzle 130 is atomized by the fan member 102, thereby creating a cooling effect in the surrounding area. The mist assembly 120 may create a cooling effect of about 20° F.

The device of the invention is simple in design and economical to manufacture. The detachable nature of the mist assembly 120 allows it to be stored when not in use or easily accessed for maintenance or replacement. The electrical power supply 150 is taken form the vehicle's 100 existing power supply so the device can run for hours without the necessity of charging a battery or other power supply.

While the invention is shown in a limited number of forms, it is not limited to just these forms, but is susceptible to various changes and modifications without departing from the spirit thereof.

What is claimed is:

1. A mist assembly for an electric fan having electric motor driven blades rotating about a central axis and covered by a guard grill, the assembly comprising;

a nozzle mounting element for mounting to the guard grill at the approximate location of the central axis of the fan, the mounting element having an intake opening for receiving a source of pressurized fluid and a discharge opening;

a single nozzle received within the discharge opening of the mounting element in snap-fit fashion, the nozzle having a nozzle element with a central orifice for discharging fluid to form a fluid mist;

wherein the nozzle mounting element is an elbow shaped member having a central bore located between the intake and discharge openings, the bore forming a right angle channel with an internally radiused rear surface at the approximate mid-region thereof, the radiused surface being machined to a flat rear support surface for an attachment element; and wherein the attachment element is a bolt having a bolt head and a threaded shaft, the nozzle mounting element having a hole for receiving the bolt shaft, whereby the shaft can extend to the fan guard for attachment to the guard, the bolt head being retained against the flat rear support surface within the central bore of the nozzle mounting element.

2. The assembly of claim 1, wherein the nozzle is a two piece tubular member having a continuous longitudinal passageway for conducting fluid, the passageway terminating in an outer mouth opening which receives a replaceable nozzle element, whereby a user may select a desired nozzle size by changing the selected replaceable nozzle element of the assembly.

3. The assembly of claim 1, wherein the intake opening of the nozzle mounting element is connected by a fluid conduit to a fluid reservoir, the reservoir being pressurized by a fluid pump.

4. An electric fan having electric motor driven blades rotating about a central axis and covered by a guard grill and a mister assembly, the mister assembly comprising;

a nozzle mounting element for mounting to the guard grill at the approximate location of the central axis of the fan, the mounting element having an intake opening for receiving a source of pressurized fluid and a discharge opening;

a single nozzle received within the output opening of the mounting element in snap-fit fashion, the nozzle having a nozzle element having a central orifice for discharging fluid to form a fluid mist;

wherein the nozzle mounting element is an elbow shaped member having a central bore located between the intake and discharge openings, the bore forming a right angle channel with an internally radiused rear surface at the approximate mid-region thereof, the radiused surface being machined to a flat rear support surface for an attachment element; and wherein the attachment element is a bolt having a bolt head and threaded shaft, the nozzle mounting element having a hole for receiving the bolt shaft, whereby the shaft can extend to the fan guard for attachment to the guard, the bolt head being retained against the flat rear support surface within the central bore of the nozzle mounting element.

5. The assembly of claim 4, wherein the single nozzle is a two piece tubular member having a continuous longitudinal passageway for conducting fluid, the passageway terminating in an outer mouth opening which receives a replaceable nozzle element, whereby a user may select a desired nozzle size by changing the selected replaceable nozzle element of the assembly.

6. The assembly of claim 5, wherein the intake opening of the nozzle mounting element is connected by a fluid conduit to a fluid reservoir, the reservoir being pressurized by a fluid pump.

7. A method for mounting a mister assembly on an electric fan having electric motor driven blades rotating about a central axis and covered by a guard grill, comprising:

mounting a nozzle to the guard grill so that the nozzle is aligned with the central axis of the fan, the nozzle being mounted by means of a mounting element with an intake opening for receiving a source of pressurized fluid and a discharge opening;

discharging fluid from the nozzle to form a fluid mist;

wherein the nozzle mounting element is an elbow shaped member having a central bore located between the intake and discharge openings, the bore forming a right angle channel with an internally radiused rear surface at the approximate mid-region thereof, the radiused surface being machined to a flat rear support surface for an attachment element;

wherein the attachment element is a bolt having a bolt head and threaded shaft, the nozzle mounting element having a hole for receiving the bolt shaft, whereby the shaft can extend to the fan guard for attachment to the guard, the bolt head being retained against the flat rear support surface within the central bore of the nozzle mounting element; and wherein the nozzle is a two piece tubular member having a continuous longitudinal passageway for conducting fluid, the passageway terminating in an outer mouth opening which receives a replaceable nozzle element, whereby a user may select a desired nozzle size by changing the selected replaceable nozzle element of the assembly.

* * * * *